US010414283B2

(12) United States Patent
Kudo et al.

(10) Patent No.: US 10,414,283 B2
(45) Date of Patent: Sep. 17, 2019

(54) V2G SYSTEM AND CHARGE/DISCHARGE CONTROL METHOD BASED ON AN ESTIMATED POWER SUPPLY-DEMAND STATE, A MINIMUM TRADING UNIT OF AN AMOUNT OF POWER, AND A TOTAL AMOUNT OF POWER SECURED FOR SELLING TO A POWER SYSTEM

(71) Applicant: HONDA MOTOR CO., LTD., Tokyo (JP)

(72) Inventors: Jun Kudo, Saitama (JP); Keiichiro Honma, Saitama (JP); Satoru Shinzaki, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/738,719

(22) PCT Filed: Jul. 15, 2015

(86) PCT No.: PCT/JP2015/070281
§ 371 (c)(1),
(2) Date: Dec. 21, 2017

(87) PCT Pub. No.: WO2017/009978
PCT Pub. Date: Jan. 19, 2017

(65) Prior Publication Data
US 2018/0186246 A1    Jul. 5, 2018

(51) Int. Cl.
*H02J 7/00* (2006.01)
*B60L 11/18* (2006.01)
(Continued)

(52) U.S. Cl.
CPC ......... *B60L 11/1842* (2013.01); *B60L 3/0046* (2013.01); *B60L 55/00* (2019.02);
(Continued)

(58) Field of Classification Search
CPC ... Y02T 90/14; Y02T 10/7005; Y02T 90/128; Y02T 10/7088; Y02T 90/163
(Continued)

(56) References Cited

U.S. PATENT DOCUMENTS

2010/0270860 A1    10/2010    Kamaga
2012/0249068 A1    10/2012    Ishida
(Continued)

FOREIGN PATENT DOCUMENTS

JP    2007-282383 A    10/2007
JP    4285578 B1    6/2009
(Continued)

OTHER PUBLICATIONS

Oct. 20, 2015, International Search Report issued for related International application No. PCT/JP2015/070281.
(Continued)

*Primary Examiner* — Arun C Williams
(74) *Attorney, Agent, or Firm* — Paratus Law Group, PLLC

(57) ABSTRACT

A V2G system includes: a power system; a charging/discharging device including an electricity storage unit, a power conversion unit that converts power transferred between the electricity storage unit and the power system, a reception unit, and a control unit that controls an operation of the power conversion unit based on a received signal; and a server device that manages charging and discharging of the electricity storage unit. The server device determines a period of time during which power is discharged from the electricity storage unit to the power system or during which the electricity storage unit is charged using power supplied from the power system, and transmits an instruction including the period of time to the charging/discharging device. The control unit of the charging/discharging device starts up
(Continued)

or stop based on the period of time indicated by the instruction from the server device.

7 Claims, 8 Drawing Sheets

(51) Int. Cl.
*H02J 3/32* (2006.01)
*H02J 4/00* (2006.01)
*H02J 13/00* (2006.01)
*B60L 3/00* (2019.01)
*B60L 55/00* (2019.01)
*B60L 58/16* (2019.01)

(52) U.S. Cl.
CPC ............... *B60L 58/16* (2019.02); *H02J 3/32* (2013.01); *H02J 4/00* (2013.01); *H02J 13/0006* (2013.01); *B60L 2240/662* (2013.01); *H01M 2220/20* (2013.01); *Y02E 60/721* (2013.01); *Y02T 90/168* (2013.01); *Y04S 10/126* (2013.01); *Y04S 30/12* (2013.01)

(58) Field of Classification Search
USPC ........................................................ 320/109
See application file for complete search history.

(56) References Cited

U.S. PATENT DOCUMENTS

| | | | |
|---|---|---|---|
| 2014/0143002 A1* | 5/2014 | Aisu | ................... B60L 11/1824 705/7.18 |
| 2014/0239894 A1 | 8/2014 | Mitsutani | |
| 2014/0327306 A1 | 11/2014 | Inoue | |
| 2016/0009192 A1* | 1/2016 | Zhang | ................. B60L 11/1848 320/109 |
| 2016/0202682 A1 | 7/2016 | Matsumoto | |

FOREIGN PATENT DOCUMENTS

| | | |
|---|---|---|
| JP | 2013-176226 A | 9/2013 |
| JP | 2013-243791 A | 12/2013 |
| JP | 2014-128140 A | 7/2014 |
| JP | 2015-053769 A | 3/2015 |
| WO | WO2011/077780 A1 | 6/2011 |
| WO | WO 2013/054435 A1 | 4/2013 |
| WO | WO 2013/118336 A1 | 8/2013 |

OTHER PUBLICATIONS

May 22, 2018, Japanese Office Action issued for related JP Application No. 2017-528079.

* cited by examiner

V2G SYSTEM AND CHARGE/DISCHARGE CONTROL METHOD BASED ON AN ESTIMATED POWER SUPPLY-DEMAND STATE, A MINIMUM TRADING UNIT OF AN AMOUNT OF POWER, AND A TOTAL AMOUNT OF POWER SECURED FOR SELLING TO A POWER SYSTEM

CROSS REFERENCE TO PRIOR APPLICATION

This application is a National Stage Patent Application of PCT International Patent Application No. PCT/JP2015/070281 (filed on Jul. 15, 2015) under 35 U.S.C. § 371, which is hereby incorporated by reference in its entirety.

TECHNICAL FIELD

The present invention relates to a V2G system and a charge/discharge control method regarding V2G (vehicle to grid) capable of bidirectional power transfer between electricity storage units provided in transport equipments and a power system.

BACKGROUND ART

Patent literature 1 discloses a charging system for a vehicle having a timing function so that charging can be reserved, in which even though the timing function is abnormal, charging can be started at a reserved charging start time as much as possible. In the charging system for a vehicle, upon occurrence of abnormality in the timing function of a timing function section, a control section determines whether start-up can be continued in a normal mode until the charging start time based on the residual power of a 12 V battery and its own power consumption. When it is determined that the start-up can be continued, the charging start time is waited in the normal mode.

Patent literature 2 discloses a load leveling system in which each battery of a plurality of vehicles is charged during non-peak power demand at a business place, which is a power consumer receiving electric power supplied from a power supply company, or by using midnight power of each vehicle owner, and the electric power stored in the charged vehicle battery is discharged during peak power demand at a business place.

PRIOR ART LITERATURE

Patent Literature

Patent Literature 1: JP-A-2013-243791
Patent Literature 2: JP-A-2007-282383
Patent Literature 3: Japanese Patent No. 4285578

SUMMARY OF THE INVENTION

Problems that the Invention is to Solve

According to the charging system for a vehicle disclosed in Patent literature 1, even though abnormality occurs in the timing function of the timing function section, since the control section continues start-up in the normal mode until the charging start time, it is possible to start charging of a high voltage battery by determining that the charging start time is reached. However, in the charging system for a vehicle, since discharge from the high voltage battery installed at the vehicle to an external power supply side is not performed, it is not possible to apply the charging system for a vehicle of Patent literature 1 to a V2G (Vehicle-to-Grid) system in which bidirectional power exchange is possible between a power system including a commercial power network and an electric vehicle such as EV (Electric Vehicle) and PHEV (Plug-in Hybrid Electric Vehicle), so that it is not possible to contribute to stabilization of a commercial power system.

In the load leveling system disclosed in Patent literature 2, power is supplied to a business place from a battery of a vehicle parked at a parking lot during the daytime so as to perform load leveling, so that the battery of the vehicle contributed to the load leveling is charged at the business place in the next morning or is charged using midnight power at home. When a vehicle using the system reaches the business place, a battery installed at the vehicle is connected to one of parking lot socket groups via a bidirectional charger. At the time point at which the battery is connected to the socket, the vehicle is in a standby mode in which no charge and discharge are performed. However, at the time point at which power demand becomes large at the business place, an instruction is sent to the vehicle such that the standby mode is shifted to a discharge mode, and at the time point at which power demand becomes small, an instruction is sent to the vehicle such that the discharge mode is shifted to the standby mode. However, the load leveling system performs load leveling by exchanging power between the business place and the vehicle and performs no load leveling in a power system including a commercial power network. Therefore, since it is not possible to increase the number of vehicles participating in V2G and the agreement probability of power trading between a power supplier and a power consumer, it is not possible to contribute to stabilization of a commercial power system.

An object of the present invention is to provide a charging/discharging device and a charge/discharge control method, capable of contributing to the stabilization of a power system.

Means for Solving the Problem

With a view to achieving the object, Claim 1 defines a V2G system including:
a power system;
a charging/discharging device including an electricity storage unit (e.g., a main battery 104 in an embodiment described below) that is provided in a transport equipment (e.g., an electrically driven transport equipment 15 in the embodiment described below), a power conversion unit (e.g., a bidirectional charger 103 in the embodiment described below) that converts power transferred between the electricity storage unit and the power system, a reception unit (e.g., a digital communication portion 102 in the embodiment described below) that receives a signal from an external device, and a control unit (e.g., a charging and discharging ECU 107 in the embodiment described below) that controls an operation of the power conversion unit based on the signal received by the reception unit; and
a server device (e.g., an aggregator 17 in the embodiment described below) that manages charging and discharging of the electricity storage unit in the charging/discharging device,
in which the server device performs a time-series analysis on an amount of power supplied from a power supplier to the power system and an amount of power supplied from the power system to a power consumer, determines a period of time during which power is discharged from the electricity storage unit of the charging/discharging device to the power system or during which the electricity storage unit is charged using power supplied from the power system based on a result of estimating a power supply-demand state of the power system and a minimum trading unit of an amount of power managed by the server device during power transfer with the power system, and transmits an instruction including the period of time during which the discharging or the charging is performed to the charging/discharging device, and the control unit of the charging/discharging device starts up or stops based on the period of time indicated by the instruction that is transmitted from the server device and is received by the reception unit.

Claim 2 defines, based on Claim 1, the V2G system, wherein in which the server device determines a period of time during which the discharging or the charging of the charging/discharging device is performed based on the result of estimating the power supply-demand state, the minimum trading unit of the amount of power managed during power transfer with the power system, and a total amount of power secured for selling to the power system.

Claim 3 defines, based on Claim 1 or 2, the V2G system, wherein in which the server device determines a period of time during which the charging of the charging/discharging device is performed based on the result of estimating the power supply-demand state, degree of contribution of the charging/discharging device to the power system, and a charge appropriateness level of a time slot in which the electricity storage unit is charged such that, as the degree of contribution increases, the electricity storage unit is charged in a time slot having a higher charge appropriateness level, the charge appropriateness level being calculated from an influence on deterioration of the electricity storage unit.

Claim 4 defines, based on any one of Claims 1 to 3, the V2G system, wherein in which in a case where an amount of power stored in the electricity storage unit is a predetermined amount or higher, the control unit of the charging/discharging device controls an operation of the power conversion unit such that the discharging starts at a time, which is earlier by a predetermined period of time than a start time of the discharging indicated by the instruction, and is performed until an end time of the discharging indicated by the instruction, and the server device manages degree of contribution of each of the charging/discharging devices to the power system and sets the contribution to be high for the charging/discharging device including the electricity storage unit which performs the discharging for a period of time longer than the period of time during which the discharging is performed indicated by the instruction.

Claim 5 defines, based on any one of Claims 1 to 3, the V2G system, wherein in which in a case where a preset activeness of discharging from the electricity storage unit to the power system is a predetermined value or higher, the control unit controls an operation of the power conversion unit such that the discharging starts at a time, which is earlier by a predetermined period of time than a start time of the discharging indicated by the instruction, and is performed until an end time of the discharging indicated by the instruction, and the server device manages degree of contribution of each of the charging/discharging devices to the power system and sets the contribution to be high for the charging/discharging device including the electricity storage unit which performs the discharging for a period of time longer than the period of time during which the discharging is performed indicated by the instruction.

Claim 6 defines, based on any one of Claims 1 to 3, the V2G system, wherein in which in a case where an amount of power stored in the electricity storage unit is a predetermined amount or higher, the control unit controls an operation of the power conversion unit such that the discharging starts at a start time of the discharging indicated by the instruction and is performed until a time which is later by a predetermined period of time than an end time of the discharging indicated by the instruction, and the server device manages degree of contribution of each of the charging/discharging devices to the power system and sets the contribution to be high for the charging/discharging device including the electricity storage unit which performs the discharging for a period of time longer than the period of time during which the discharging is performed indicated by the instruction.

Claim 7 defines, based on any one of Claims 1 to 3, the V2G system, wherein in which in a case where a preset activeness of discharging from the electricity storage unit to the power system is a predetermined value or higher, the control unit of the charging/discharging device controls an operation of the power conversion unit such that the discharging starts at a start time of the discharging indicated by the instruction and is performed until a time which is later by a predetermined period of time than an end time of the discharging indicated by the instruction, and the server device manages degree of contribution of each of the charging/discharging devices to the power system and sets the contribution to be high for the charging/discharging device including the electricity storage unit which performs the discharging for a period of time longer than the period of time during which the discharging is performed indicated by the instruction.

Claim 8 defines a method of charging and discharging an electricity storage unit (e.g., a main battery 104 in an embodiment described below) in a V2G system, the V2G system including a power system, a charging/discharging device, and a server device (e.g., an aggregator 17 in the embodiment described below), the charging/discharging device including the electricity storage unit that is provided in a transport equipment (e.g., an electrically driven transport equipment 15 in the embodiment described below), a power conversion unit (e.g., a bidirectional charger 103 in an embodiment described below) that converts power transferred between the electricity storage unit and the power system, a reception unit (e.g., a digital communication portion 102 in the embodiment described below) that receives a signal from an external device, and a control unit (e.g., a charging and discharging ECU 107 in the embodiment described below) that controls an operation of the power conversion unit based on the signal received by the reception unit, the server device managing charging and discharging of the electricity storage unit in the charging/discharging device, and the method including:

causing the server device to perform a time-series analysis on an amount of power supplied from a power supplier to the power system and an amount of power supplied from the power system to a power consumer, to determine a period of time during which power is discharged from the electricity storage unit of the charging/discharging device to the power system or during which the electricity storage unit is charged using power supplied from the power system based on a result of estimating a power supply-demand state of the power system and a minimum trading unit of an amount of power managed by the server device during power transfer with the power system, and to transmit an instruction including the period of time during which the discharging or the charging is performed to the charging/discharging device; and causing the control unit of the charging/discharging device to start up or stop based on the period of time indicated by the instruction that is transmitted from the server device and is received by the reception unit.

Advantageous Effects of the Invention

According to Claims 1 to 8, the period of time during which the electricity storage unit of the charging/discharging device performs the charging and discharging is determined by the server device based on the result of estimating the power supply-demand state, and the charging/discharging device operates according to the instruction from the charging/discharging device. Therefore, by supplying power from the charging/discharging device to the power system according to the instruction from the server device in a time slot in which the amount of power supply is tight with respect to the amount of power demand, the stability of power supply from the power system to the power consumer is improved. In addition, by charging the electricity storage unit of the charging/discharging device in a time slot in which the amount of power supply is surplus with respect to the amount of power demand, the stability of the power system is improved. In addition, by setting the incentive to be high in a case where charging and discharging is performed according to the instruction from the server device, the profit rate of the owner of the charging/discharging device increases. Further, the period of time during which the electricity storage unit of the charging/discharging device performs the charging and discharging is determined by the server device based on the minimum trading unit of the amount of power managed during power transfer with the power system, and the charging/discharging device operates according to the instruction from the charging/discharging device. Accordingly, the agreement probability of selling power from the charging/discharging device to the server device, or the agreement probability of selling power from the server device to the power system can be improved. Due to this advantageous effect, the active discharging of the charging/discharging device can be encouraged, and the power system can be stabilized. This way, the benefits of four parties involved in V2G including the server device, the owner of the charging/discharging device, an operator of the power system, the power consumer can be maximized.

In addition, the control unit of the charging/discharging device may be suspended during a period of time other than the period of time during which the charging and discharging is performed according to the instruction from the server device and the wait time thereof. Therefore, the durability of the control unit can be secured. In addition, the power consumption by the control unit can be reduced during a period of time during which charged and discharged is not performed.

Further, the period of time in which charging and discharging is performed indicated by the instruction from the server device is determined based on the result of estimating the power supply-demand state, which is obtained by the time-series analysis of the amount of power, and the minimum trading unit of the amount of power which is managed by the server device. Therefore, the content of the instruction to the charging/discharging device can be determined based on the time slot in which the amount of power supply is tight with respect to the amount of power demand and the time slot in which the amount of power supply is surplus with respect to the amount of power demand.

According to Claim 2, the period of time during which the charging/discharging device performs the discharging is determined based on the result of estimating the power supply-demand state, the minimum trading unit, which is used in a power trading market and generally has a considerable value, and the total amount of power secured by the server device for selling to the power system, It is difficult for the electricity storage unit provided in the transport equipment to store a large amount of power that fulfills the minimum trading unit, and the charging/discharging device is not required to discharge a large amount of power. Therefore, the agreement probability of selling power from the charging/discharging device to the server device is improved. In addition, the server device can sell power to the power system as much as possible.

According to Claim 3, the aggregator 17 determines a period of time during which the charging of the charging/discharging device is performed based on the contribution to the power system and the charge appropriateness level such that, as the degree of contribution increases, the electricity storage unit is charged in a time slot having a higher charge appropriateness level. The charging/discharging device having a high contribution is likely to be instructed to start the charging in a time slot having a high charge appropriateness level. Therefore, the progress of deterioration of the electricity storage unit can be delayed. In particular, in a time slot having a high charge appropriateness level, the progress of deterioration of the electricity storage unit can be made substantially zero. Due to this advantageous effect, the owner of the charging/discharging device, which hesitates to participate in V2G due to a concern that the electricity storage unit may deteriorate when participating in V2G, can be encouraged to actively perform the discharging of the charging/discharging device.

According to any one of Claims 4 to 7, the contribution to the power system is set to be high for the charging/discharging device including the electricity storage unit which performs the discharging for a period of time longer than that indicated by the instruction from the server device. In a case where the contribution is set to be high, the profit rate of the owner of the charging/discharging device during charging increases. Therefore, the active discharging of the charging/discharging device can be encouraged. In addition, by performing the discharging in a time slot in which the amount of power supply is tight with respect to the amount of power demand, the stability of the power system is improved. In addition, in the power transaction market of V2G, separately from an ordinary transaction market, a previous adjustment market in which both the unit transaction time and the unit transaction amount are small is present. In a case where the discharging can be performed for a period of time longer than that of discharging determined by the determination portion, the charging/discharging device can sell power in the previous adjustment market, and the power system can be further stabilized. This way, the benefits of four parties involved in V2G including the server device, the owner of the charging/discharging device, an operator of the power system, the power consumer can be maximized.

MODES FOR CARRYING OUT THE INVENTION

Hereinafter, an embodiment of the present invention will be described with reference to the drawings.

V2G (Vehicle-to-Grid) is a system that performs power interchange between a power system including a commercial power network and an electric vehicle and when the electric vehicle is not used as a movement means, an electricity storage unit installed at the electric vehicle is used as a power storage facility. Therefore, bidirectional power exchange is performed between the electric vehicle participating in the V2G and the power system.

Figure 1:
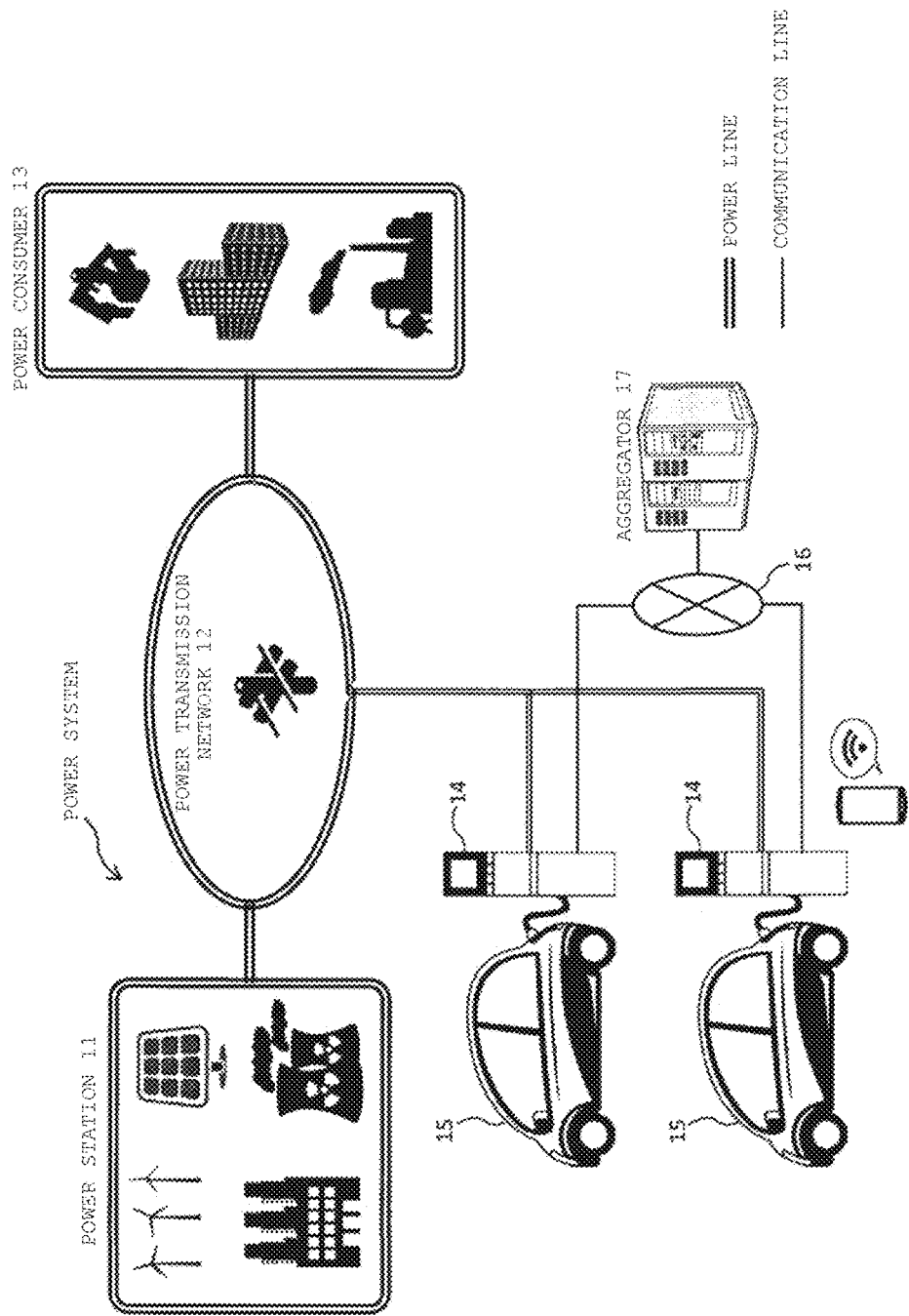
FIG. 1 is a diagram illustrating an entire configuration of a V2G system.

FIG. 1 is a diagram illustrating an entire configuration of the V2G system. As illustrated in FIG. 1, the V2G system includes a power system, which includes a power station 11 for generating power by energy of thermal power, wind power, atomic power, sunlight and the like, a power transmission network 12 of power generated by a power supplier including the power station 11, and the like, a power consumer 13 that receives the supply of power in accordance with electricity demand, an external power supply 14 connected to the power transmission network 12 via a power distribution facility (not illustrated), an electric vehicle 15 such as EV (Electric Vehicle) and PHEV (Plug-in Hybrid Electric Vehicle) having a chargeable/dischargeable electricity storage unit, a communication network 16, and an aggregator 17 that manages charge/discharge of the electricity storage unit of the electric vehicle 15 via the external power supply 14 connected to the communication network 16. The aggregator 17 can manage charge/discharge of a plurality of a power storage device including the electricity storage unit of the electric vehicle 15, thereby satisfying the requirements of an electric power company running the power station 11, a power transmission company running the power transmission network 12, and the like.

Figure 2:
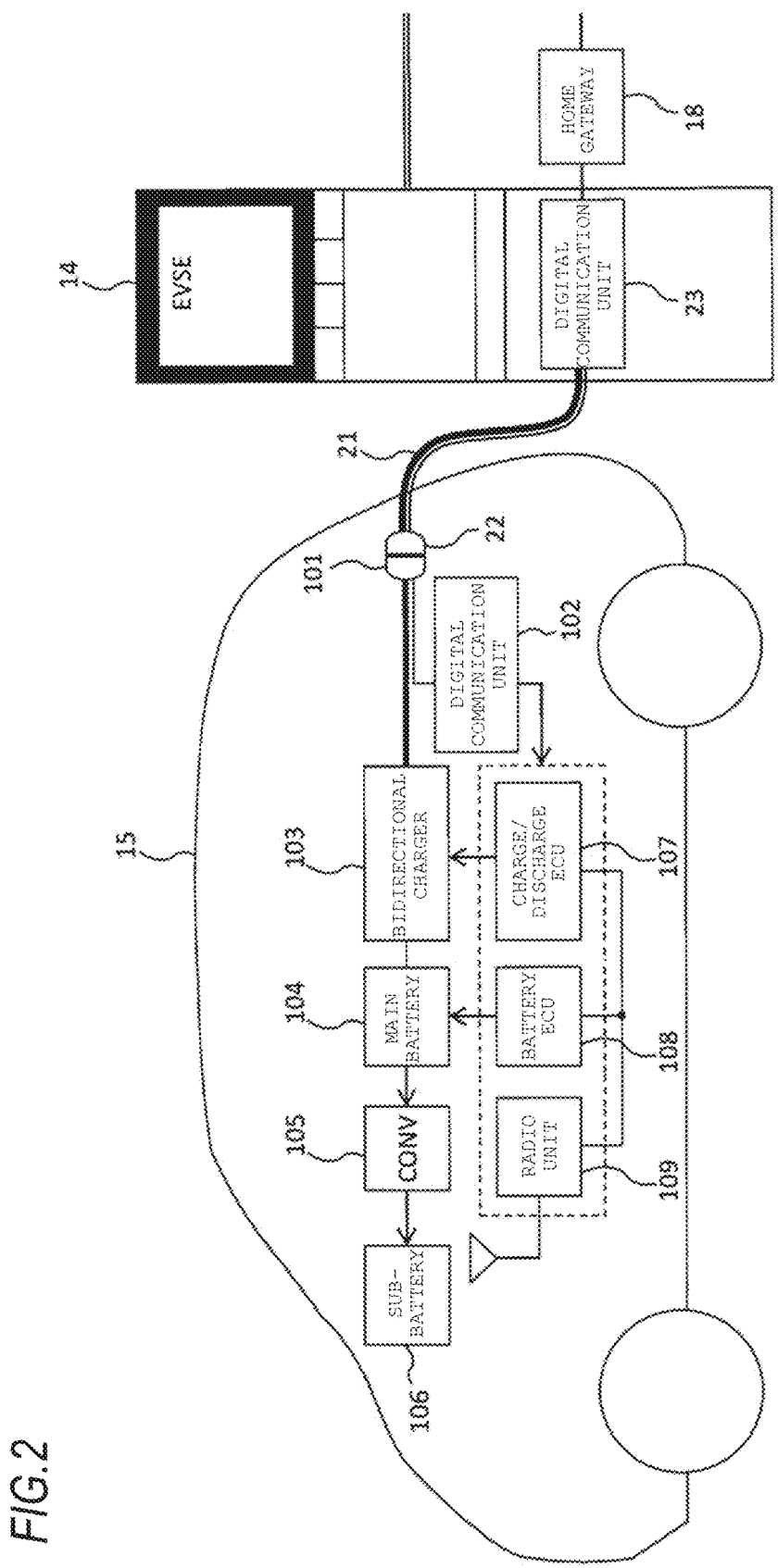
FIG. 2 is a block diagram illustrating an external power supply and an electric vehicle constituting a part of the V2G system illustrated in FIG. 1.

FIG. 2 is a block diagram illustrating the external power supply 14 and the electric vehicle 15 constituting a part of the V2G system illustrated in FIG. 1. As illustrated in FIG. 2, the external power supply 14 includes a connector 22 provided at a distal end of a cable 21 and a digital communication unit 23. The electric vehicle 15 includes an inlet 101, a digital communication unit 102, a bidirectional charger 103, a main battery 104, a converter (CONV) 105, a sub-battery 106, a charge/discharge ECU 107, a battery ECU 108, and a radio unit 109. When the electric vehicle 15 participates in the V2G, the start-up state of an electric component of the electric vehicle 15 lasts for hours due to charge/discharge of the electricity storage unit of the electric vehicle 15 or its standby. However, since the long-term continuation of the start-up state of the electric component is not preferable in terms of durability, it is preferable to stop the electric component according to necessity.

Hereinafter, each element of the external power supply 14 will be described.

The connector 22 performs power exchange between the external power supply 14 and the electric vehicle 15 in the state of being connected to the inlet 101 of the electric vehicle 15. The digital communication unit 23 is connected to the communication network 16 via a home gateway 18, and superimposes a signal obtained from the aggregator 17 on electricity, which is exchanged between the external power supply 14 and the electric vehicle 15, by using a power line communication technology. Therefore, a control signal from the aggregator 17 is sent to the electric vehicle 15 if the connector 22 is being connected to the inlet 101 of the electric vehicle 15.

Next, each element of the electric vehicle 15 will be described.

To the inlet 101, the connector 22 of the external power supply 14 is detachable. The digital communication unit 102 receives the signal superimposed on the electricity from the external power supply 14 by the power line communication (digital communication) technology in the state in which the connector 22 of the external power supply 14 is mounted at the inlet 101, and when the electric vehicle 15 participates in the V2G, the digital communication unit 102 performs an operation according to an instruction indicated by the signal. The connection form between the external power supply 14 and the electric vehicle 15 is not limited to the physical connection by the inlet 101 and the connector 22, and may include electromagnetic connection such as non-contact charge/discharge in the state in which the inlet 101 and the connector 22 approach to each other.

The bidirectional charger 103 converts an AC voltage obtained from the external power supply 14 via the inlet 101 and the digital communication unit 102 into a DC voltage. By the power converted into the DC voltage by the bidirectional charger 103, the main battery 104 is charged. Furthermore, the bidirectional charger 103 converts a DC voltage discharged from the main battery 104 into an AC voltage. The power converted into the AC voltage by the bidirectional charger 103 is sent to the external power supply 14 via the inlet 101. The main battery 104, for example, is a secondary battery that outputs a DC high voltage of 100 V to 200 V, and supplies power to an electric motor (not illustrated) which is a driving source of the electric vehicle 15.

The converter 105 drops the output voltage of the main battery 104 to a constant DC voltage. By the power dropped by the converter 105, the sub-battery 106 is charged. The sub-battery 106, for example, is a secondary battery that outputs a DC low voltage of 12 V, and supplies the power to an auxiliary machine and the like of the electric vehicle 15.

The charge/discharge ECU 107, the battery ECU 108, and the radio unit 109 surrounded by a dotted line of FIG. 2 start up or stop in accordance with the instruction indicated by the signal received in the digital communication unit 102 even when the electric vehicle 15 is being parked. The charge/discharge ECU 107 controls an operation of the bidirectional charger 103. The charge/discharge ECU 107 controls the operation of the bidirectional charger 103, so that the main battery 104 is charged or discharged. The battery ECU 108 derives a remaining capacity (SOC: State of Charge) of the main battery 104 and performs control relative to a power storage state and the like of the main battery 104.

The radio unit 109 wirelessly transmits, to the aggregator 17, information on participation or nonparticipation of the electric vehicle 15 in the V2G, the degree of activeness in the case of participating in the V2G, a time period in which participation in the V2G is possible, a discharge state of the main battery 104, and the like. The participation or nonparticipation in the V2G, the degree of activeness in the case of participating in the V2G, and the time period, in which participation in the V2G is possible, are set in advance by an owner of the electric vehicle 15. The owner of the electric vehicle 15 is assumed to understand that a discharge opportunity and a discharge amount of the main battery 104 are large as the degree of activeness of participation in the V2G is high.

Figure 3:
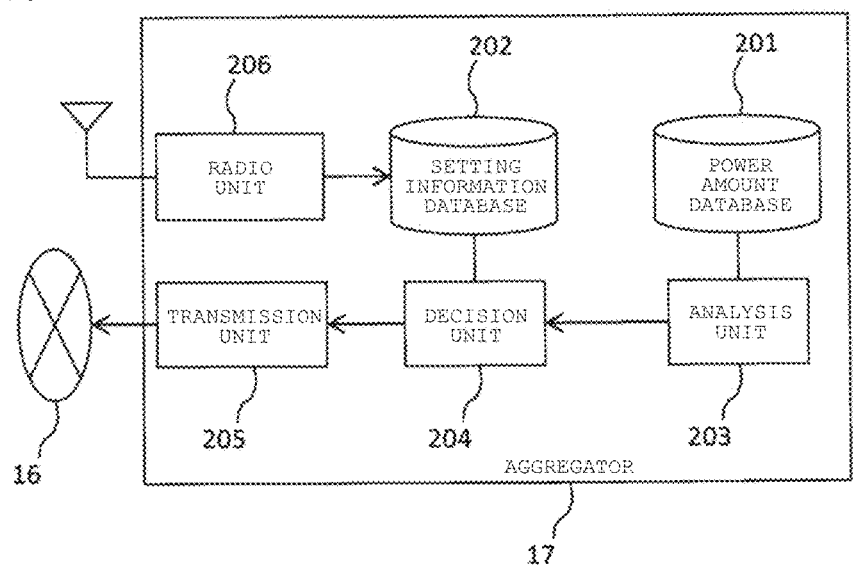
FIG. 3 is a block diagram illustrating an aggregator and a communication network constituting a part of the V2G system illustrated in FIG. 1.

FIG. 3 is a block diagram illustrating the aggregator 17 and the communication network 16 constituting a part of the V2G system illustrated in FIG. 1. As illustrated in FIG. 3, the aggregator 17 includes a power amount database 201, a setting information database 202, an analysis unit 203, a decision unit 204, a transmission unit 205, and a radio unit 206.

The power amount database 201 is a database having past and current information on a power amount supplied from the power supplier including the power station 11 to the power system and a power amount supplied from the power system to the power consumer 13. The setting information database 202 is a database having information on the participation or nonparticipation of each electric vehicle 15 in the V2G, the degree of activeness in the case of participating in the V2G, and the time period, in which participation in the V2G is possible, the degree of contribution for the power system, and the like.

The analysis unit 203 performs time-series analysis of a power amount by using the information of the power amount database 201, thereby performing power demand/supply prediction in the power system. The decision unit 204 decides a time, at which discharge of the main battery 104 of the electric vehicle 15 to the power system or charge of the main battery 104 by power supplied from the power system is performed, for each electric vehicle 15 based on the power demand/supply prediction result obtained by the analysis unit 203, information of each electric vehicle 15 stored in the setting information database 202, and the like. The transmission unit 205 transmits an instruction to the electric vehicle 15 via the communication network 16 and the external power supply 14, wherein the instruction includes the time at which the discharge or the charge of the main battery 104 is performed and the time is decided by the decision unit 204. The decision unit 204 sets an incentive when performing the charge/discharge of the main battery 104 of the electric vehicle 15 according to an instruction from the aggregator 17 to be higher than an incentive when performing the charge/discharge in other time periods. The incentive is a profit of an owner of the electric vehicle 15 when the electric vehicle 15 sells and buys power, and the profit is mainly money.

The radio unit 206 receives the information on the participation or nonparticipation in the V2G, the degree of activeness in the case of participating in the V2G, the time period in which participation in the V2G is possible, the discharge state of the main battery 104, and the like, which are wirelessly transmitted from the electric vehicle 15. The information received in the radio unit 206 is stored in the setting information database 202.

Figure 4:
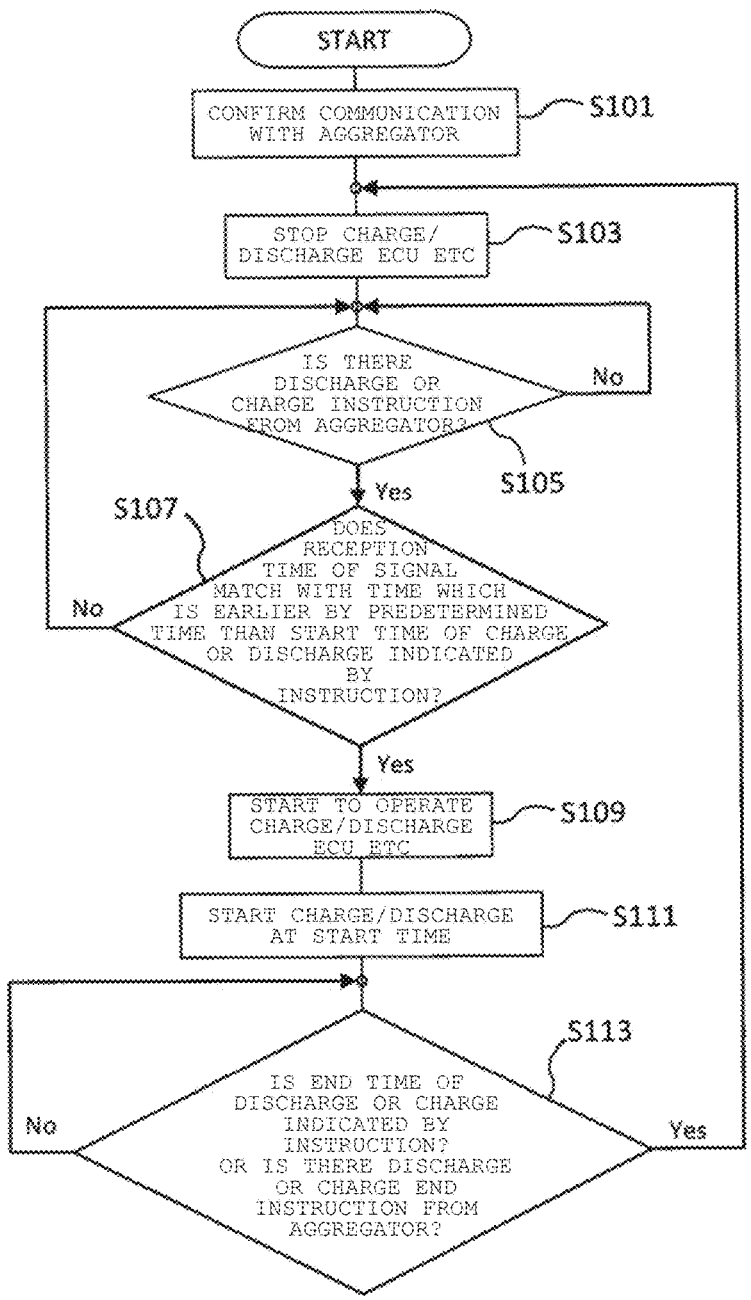
FIG. 4 is a flowchart for explaining charge/discharge control of a main battery provided in an electric vehicle managed by the aggregator.

Next, control of the charge/discharge of the main battery 104 of the electric vehicle 15, which is managed by the aggregator 17, will be described with reference to FIG. 4. When the connector 22 of the external power supply 14 is mounted at the inlet 101 of the electric vehicle 15, the digital communication unit 102 of the electric vehicle 15 confirms whether it is possible to communicate with the aggregator 17 via the external power supply 14 and the communication network 16 (step S101). Next, the charge/discharge ECU 107, the battery ECU 108, and the radio unit 109 of the electric vehicle 15 stop operating (step S103). Next, when the digital communication unit 102 of the electric vehicle 15 receives a signal including an instruction for discharge or charge of the main battery 104 from the aggregator 17 (step S105: Yes), the procedure proceeds to step S107.

In step S107, the digital communication unit 102 determines whether the current time is a timing earlier by a predetermined time to a start time of the discharge or charge indicated by the instruction from the aggregator 17. When the current time is a time earlier by the predetermined time, the procedure proceeds to step S109, and when the current time is a time earlier by the predetermined time or more, the procedure returns to step S105. When the signal reception time point in step S105 already exceeds the time earlier by the predetermined time to the start time, the procedure proceeds to step S109 in order to prevent frequency occurrence of start-up and stop. In step S109, the digital communication unit 102 starts to operate the charge/discharge ECU 107, the battery ECU 108, and the radio unit 109. Next, when the start time is reached, the discharge or charge of the main battery 104 of the electric vehicle 15 is started (step S111). Next, when an end time indicated by an instruction received in advance from the aggregator 17 is reached or when the digital communication unit 102 receives a discharge or charge end instruction from the aggregator 17 (step S113: Yes), the procedure returns to step S103, so that the charge/discharge ECU 107, the battery ECU 108, and the radio unit 109 of the electric vehicle 15 stop operating.

As described above, the charge/discharge ECU 107 starts the discharge of the main battery 104 at the discharge start time indicated by an instruction from the aggregator 17, and ends the discharge of the main battery 104 at the discharge end time indicated by an instruction from the aggregator 17. However, when the SOC of the main battery 104 is equal to more than a predetermined value or the degree of activeness of participation in the V2G is equal to more than a predetermined value, the charge/discharge ECU 107 may start the discharge from a time earlier to the start time indicated by the instruction from the aggregator 17, or end the discharge after the end time indicated by the instruction. For example, the discharge start time indicated by the instruction from the aggregator 17 is 18:00 and the end time is 19:00, the charge/discharge ECU 107 may start the discharge of the main battery 104 at 17:30 or end the discharge of the main battery 104 at 19:30. As described above, the aggregator 17 sets the degree of contribution for the power system and an incentive to be high in the electric vehicle 15 having the main battery 104 discharged longer than the instruction from the aggregator 17. Furthermore, in a power trading market in the V2G, there is an immediately previous adjustment market in which a unit trading time and a unit trading amount are small, separately from a normal trading market. When the main battery 104 can be discharged longer than the instruction from the aggregator 17, it is possible to perform power selling in the immediately previous adjustment market, so that it is possible to further contribute to stabilization of the power system.

Figure 5:
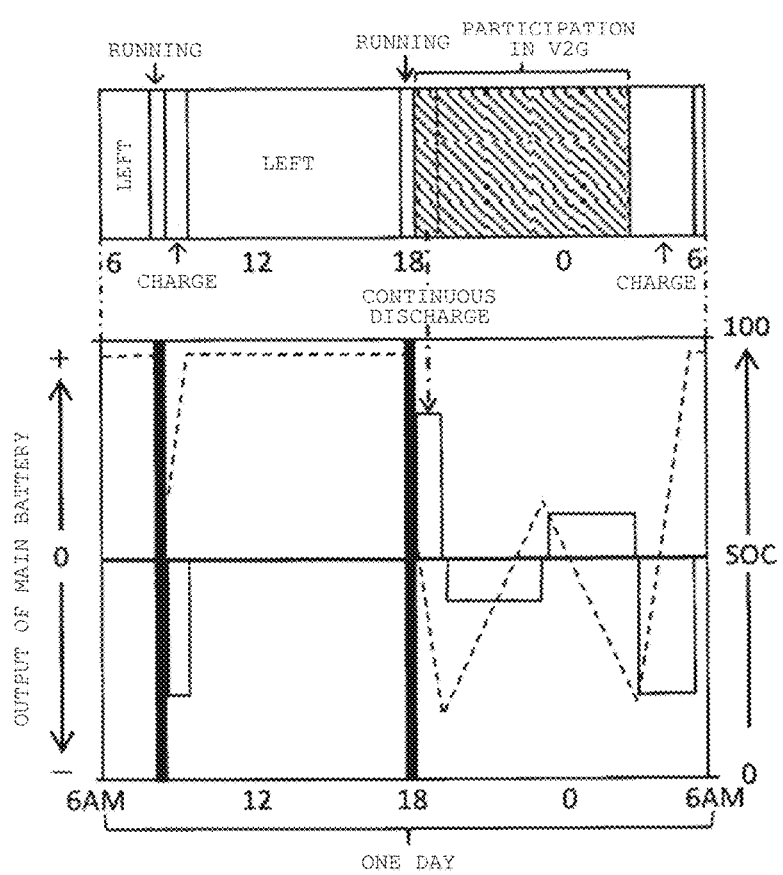
FIG. 5 is a diagram illustrating each change in output and SOC of a main battery provided in an electric vehicle accompanied with an example of charge/discharge (including the V2G) of the main battery.

Next, the management of the aggregator 17 relative to the charge/discharge of the main battery 104 of the electric vehicle 15 will be described. FIG. 5 is a diagram illustrating each change in the output and the SOC of the main battery 104 provided in the electric vehicle 15 accompanied with an example of charge/discharge (including the V2G) of the main battery 104. In the example illustrated in FIG. 5, around 8:00 in the morning, the electric vehicle 15, for example, runs from its own home to an office and then the main battery 104 is charged in the office. Then, the main battery 104 is left until about 6:00 p.m. and the electric vehicle 15 runs from the office to its own home around 6:00 p.m. When the electric vehicle 15 reaches its own home and is connected to the external power supply 14, it can participate in the V2G. In the example illustrated in FIG. 5, since a power demand amount rapidly increases for about 2 hours from about 6:00 p.m. at which the electric vehicle 15 returns to its own home and a power supply amount is smaller than the power demand amount, a discharge instruction is sent from the aggregator 17 to the electric vehicle 15 connected to the external power supply 14, so that the main battery 104 is continuously discharged. Thereafter, when the power demand is reduced, the main battery 104 is charged and discharged in accordance with an instruction from the aggregator 17 until about 3:00 am. After 3:00 a.m., the main battery 104 is fully charged for next morning running.

Figure 6:
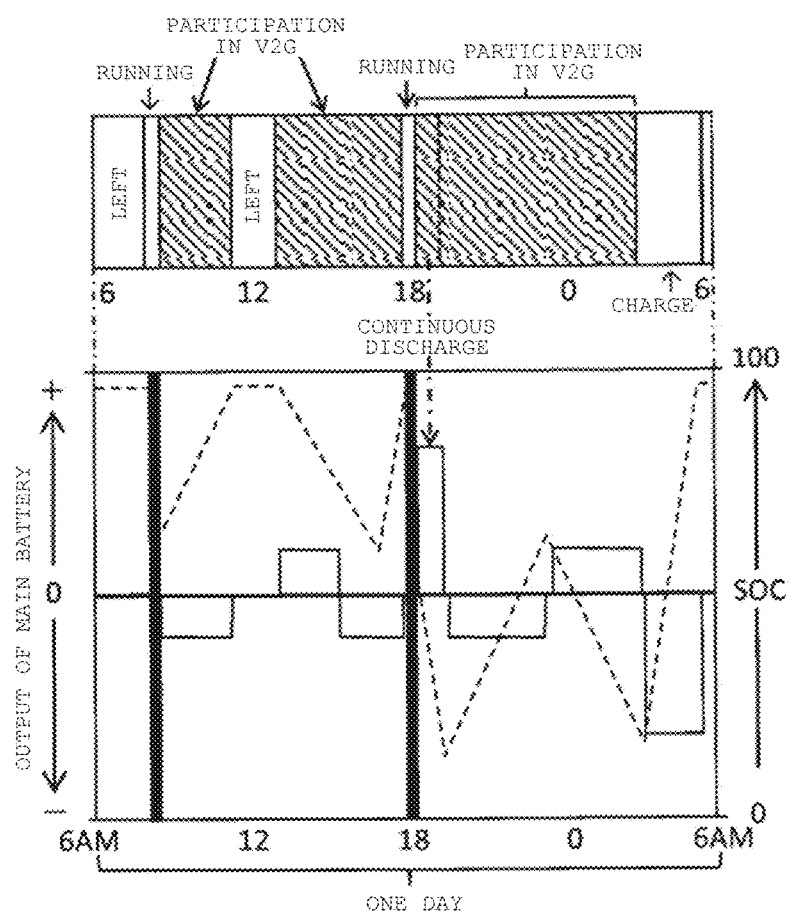
FIG. 6 is a diagram illustrating each change in output and SOC of a main battery provided in an electric vehicle accompanied with another example of charge/discharge (including the V2G) of the main battery.
Figure 7:
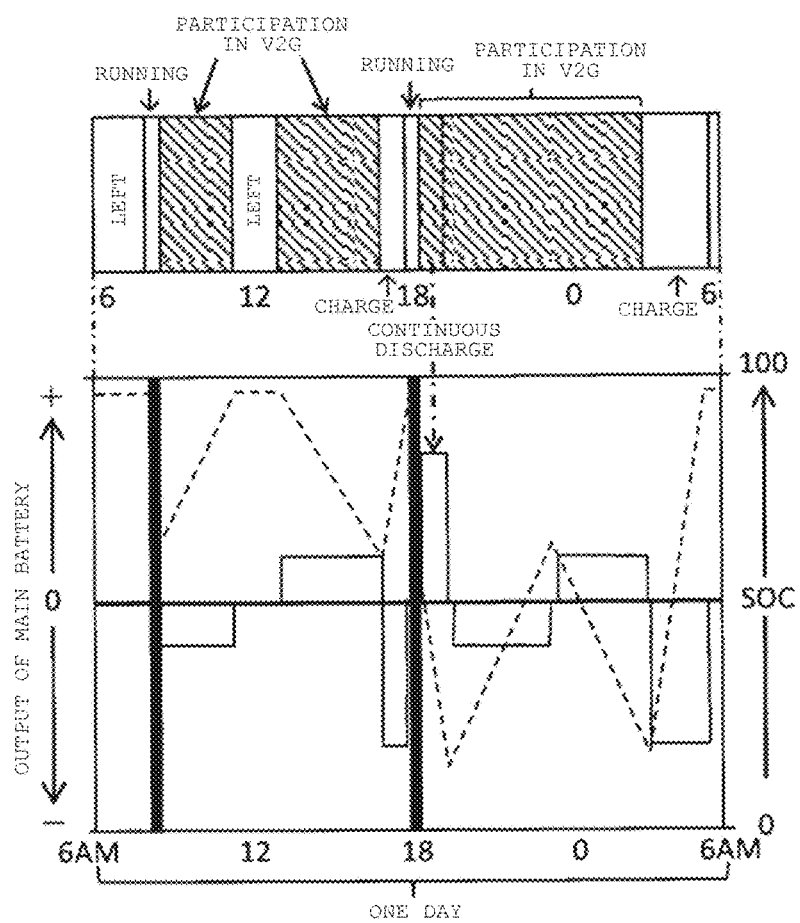
FIG. 7 is a diagram illustrating each change in output and SOC of a main battery provided in an electric vehicle accompanied with another example of charge/discharge (including the V2G) of the main battery.

Within the V2G participation time period illustrated in FIG. 5, in a time period other than the continuous discharge, a charge/discharge instruction may be sent to the electric vehicle 15 in order to supply power for adjusting a frequency in the power system to be stabilized. Even though no power is actually supplied to the power system, the aggregator 17 may set the degree of contribution for the power system to be high in the electric vehicle 15 that contributes the stabilization of the frequency in the power system. Furthermore, when the external power supply 14 communicable with the aggregator 17 is provided to an office, the V2G participation performed about 6:00 p.m. to about 3:00 a.m. illustrated in FIG. 5 may be performed in a daytime period as illustrated in FIG. 6 and FIG. 7. As with the example illustrated in FIG. 6 and FIG. 7, a stop state and a start-up state of the charge/discharge ECU 107 and the like are switched for a vehicle actively participating in the V2G, so that it is possible to ensure durability of these electric components.

Figure 8:
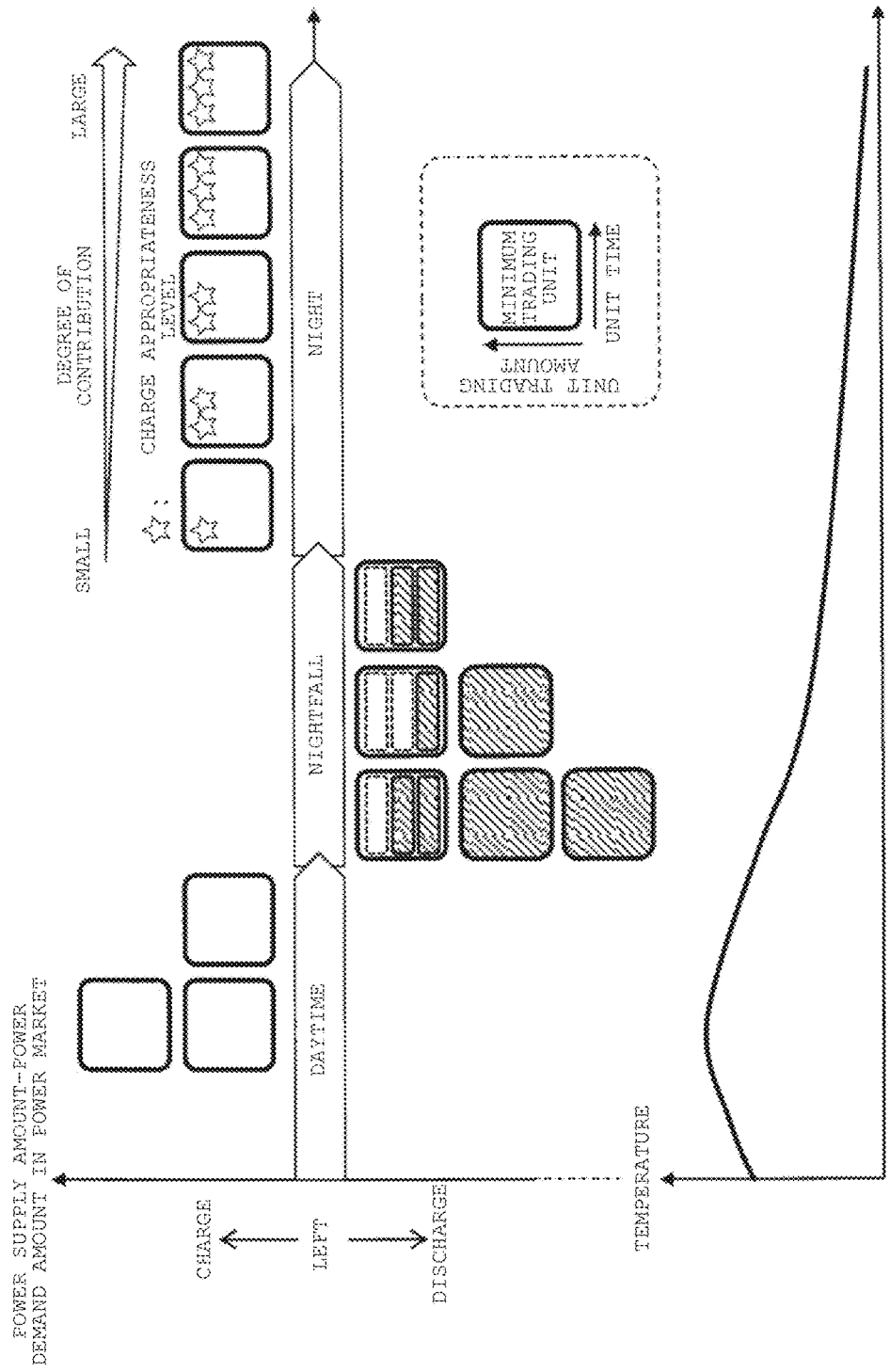
FIG. 8 is a diagram illustrating a change in a demand and supply balance of a power market and a temperature in a V2G participation time period illustrated in FIG. 5 and a time period earlier to the V2G participation time period.

FIG. 8 is a diagram illustrating a change in a demand and supply balance of a power market and a temperature in the V2G participation time period illustrated in FIG. 5 and a time period earlier to the V2G participation time period. As illustrated in FIG. 8, in a power market of a day until about 5:00 p.m., since there is a margin in a power supply amount with respect to a power demand amount, the aggregator 17 instructs the electric vehicle 15, which can participate in the V2G, to charge the main battery 104 by power from the power system. However, since the power supply amount is smaller than the power demand amount for about two hours from about 6:00 p.m. of nightfall, the aggregator 17 instructs the electric vehicle 15, which can participate in the V2G, to perform discharge of the main battery 104 to the power system. Thereafter, at night, since there is also a margin in the power supply amount with respect to the power demand amount, the aggregator 17 instructs the electric vehicle 15, which can participate in the V2G, to charge the main battery 104 by power from the power system.

As described above, the aggregator 17 sends the discharge or charge instruction to the main battery 104 of the electric vehicle 15 which can participate in the V2G, wherein the instruction instructs a start time and an end time of charge or discharge. The electric vehicle 15 exchanges a power amount depending on a time from the start time to the end time with the power system. However, a power amount (Wh) per unit time, which is exchanged between the electric vehicle 15 and the power system, is smaller than a minimum trading unit (=a unit time×a unit trading amount) managed when the aggregator 17 exchanges power with the power system. Therefore, the decision unit 204 of the aggregator 17 decides a discharge time of each electric vehicle 15 such that a difference between a multiple of the minimum trading unit and a total power amount secured in the aggregator 17 for power selling to the power system can be compensated for by an amount of power discharged from the main battery 104 of each electric vehicle 15. In FIG. 8, the minimum trading unit is expressed by a square shape and the total power amount secured in the aggregator 17 for power selling to the power system is expressed by a hatched area. The total power amount secured in the aggregator 17 for power selling to the power system includes an amount of power supplied from the power supplier including the power station 11, in addition to an amount of power discharged from other electric vehicles.

Meanwhile, an amount of power, which can be reversely supplied (can be sold) by one electric vehicle, is about 15 kWh to 50 kWh. On the other hand, in the aforementioned minimum trading unit used in a power trading market, for example, a value of 0.1 MWh (=1 hr×0.1 MW) to 1 MWh (=1 hr×1 MW), which is not generally small at all, is set. Accordingly, it is difficult to satisfy the minimum trading unit only by a single electric vehicle or a small number of electric vehicles. Therefore, in consideration of the total power amount secured in the aggregator 17 for power selling to the power system, setting discharge times of each electric vehicle is important to establish power trading including an agreement of power selling from the electric vehicle 15 to the aggregator 17.

When laws for an environmental car in each country such as a ZEV (Zero Emission Vehicle) law in USA are enforced, an accelerated increase is expected in the number of electric vehicles which can participate in the V2G in a company. Accordingly, the aggregator 17 designates discharge times of each electric vehicle, so that it is possible to easily satisfy the minimum trading unit and thus to rapidly increase power of each electric vehicle to be supplied to the power system.

Furthermore, based on the power demand/supply prediction result obtained by the analysis unit 203, the degree of contribution of each electric vehicle 15 for the power system stored in the setting information database 202, and a charge appropriateness level of a charge time period of the main battery 104 derived from the degree of deterioration influence applied to the main battery 104, the decision unit 204 of the aggregator 17 decides a charge time of the electric vehicle 15 such that the main battery 104 is charged in a time period in which the charge appropriateness level is high as the degree of contribution is high. As a consequence, there are many cases where a charge start time in the electric vehicle 15 with a high degree of contribution is a time period in which the charge appropriateness level is high, so that it is possible to delay progress of deterioration of the main battery 104 in the electric vehicle 15 with a high degree of contribution.

The degree of deterioration influence applied to the main battery 104 is derived based on change prediction of a day's temperature in the position of the electric vehicle 15. In general, when a temperature is excessively high during charge of a secondary battery, the degree of deterioration influence becomes high. In the example illustrated in FIG. 8, in a time period just shifted to night from nightfall, since a temperature is still high and the degree of deterioration influence is high, the charge appropriateness level is low. However, in a midnight time period, when the temperature falls and for example, reaches about 25° C. since the degree of deterioration influence becomes low, the charge appropriateness level becomes high.

In contrast, in a cold region, the temperature excessively falls in a midnight time period. When the temperature at the time of charge falls, since there occurs a precipitation phenomenon of an active material in a negative electrode which is called electrodeposition, it is necessary to limit a charging current in consideration of deterioration of durability for the charge/discharge of the main battery 104. Furthermore, in a general lithium ion battery, when the temperature at the time of charge falls, since the activity of a chemical reaction in the main battery 104 falls, a long time is required for the charge of the main battery 104 by constant voltage charge. Due to these factors, since a long time is required for the full charge of the main battery 104, a long time is also required to use electric components depending on charge. As a consequence, since the usage deterioration of the electric components is also promoted, the charge appropriateness level is low in the midnight time period of the cold region. On the other hand, in the case of the time period just shifted to night from nightfall, since the temperature is higher than that of the midnight time period, it is not necessary to limit the charging current. Furthermore, since a long time is not required for the full charge of the main battery 104, the charge appropriateness level is higher than that of the midnight time period.

Furthermore, the aggregator 17 sets the degree of contribution for the power system and an incentive to be high in the electric vehicle 15 having the main battery 104 discharged longer than the discharge time decided by the decision unit 204. For example, when the start time of the discharge time decided by the decision unit 204 is 18:00 and the end time is 19:00, the aggregator 17 sets the degree of contribution to be high in the electric vehicle 15 of the main battery 104 discharged from 17:30 to 19:00 or the electric vehicle 15 of the main battery 104 discharged from 18:00 to 19:30.

As described above, according to the present embodiment, the charge/discharge time of the main battery 104 of the electric vehicle 15 participating in the V2G is decided by the aggregator 17 based on the power demand/supply prediction result and the like in the power system. Therefore, in the time period in which the power supply amount is smaller than the power demand amount, when power is supplied from the electric vehicle 15 to the power system according to an instruction from the aggregator 17, the stability of supply of power to the power consumer 13 from the power system is improved. In the time period in which there is a margin in the power supply amount with respect to the power demand amount, when the main battery 104 of the electric vehicle 15 is charged, the stability of the power system is improved. Furthermore, an incentive of an owner of the electric vehicle 15 in the case of performing charge/discharge according to an instruction from the aggregator 17 is set to be high, resulting in an increase in a profit ratio of the owner of the electric vehicle 15 when performing the V2G. Moreover, the charge/discharge time of the main battery 104 of the electric vehicle 15 is decided by the aggregator 17 based on the minimum trading unit of a power amount managed when exchanging power with the power system. Thus, it is possible to improve the probability of an agreement of power selling from the electric vehicle 15 to the aggregator 17 and the probability of power selling from the aggregator 17 to the power system. By such advantages, it is possible to promote active participation of the electric vehicle 15 in the V2G, so that the stability of the power system is also achieved. As described above, according to the present embodiment, it is possible to maximize a profit of four parts of the aggregator 17, an owner of the electric vehicle 15, a person running the power system, and the power consumer 13, which are involved in the V2G. Moreover, since the charge/discharge ECU 107, the battery ECU 108, and the radio unit 109 of the electric vehicle 15 do not operate except for the charge/discharge time according to an instruction from the aggregator 17 and a standby time thereof, it is possible to ensure durability of these elements which can stop. Furthermore, it is possible to reduce power consumption by these elements which can stop.

Furthermore, the aggregator 17 decides a discharge time of each electric vehicle 15 such that a difference between a multiple of the minimum trading unit, which is used in a power trading market and is not generally small at all, and a total power amount secured in the aggregator 17 for power selling to the power system can be compensated for by an amount of power discharged from the main battery 104 of each electric vehicle 15. The main battery 104 of the electric vehicle 15 has difficulty in accumulating large power to the extent that the minimum trading unit is satisfied and discharge of large power is not required for the electric vehicle 15, but since the aforementioned difference is smaller than the minimum trading unit, the agreement probability of power selling from the electric vehicle 15 to the aggregator 17 is improved. Furthermore, the aggregator 17 can maximally perform power selling to the power system.

Furthermore, based on the degree of contribution for the power system and the charge appropriateness level, the aggregator 17 decides the charge time of the electric vehicle 15 such that the main battery 104 is charged in the time period in which the charge appropriateness level is high as the degree of contribution is high. Since there are many cases where charge start is instructed in the time period in which the temperature is low with respect to the electric vehicle 15 with a high degree of contribution, it is possible to delay progress of deterioration of the main battery 104. Particularly, in the time period in which the charge appropriateness level is high, it is possible to allow the progress of deterioration of the main battery 104 to be approximately zero. By such advantages, it is possible to promote active participation of the electric vehicle 15 in the V2G with respect to an owner of the electric vehicle 15 who hesitates participation in the V2G due to anxiety such as deterioration of the electricity storage unit when participating in the V2G.

Furthermore, when the SOC of the main battery 104 is equal to more than a predetermined value or the degree of activeness of participation in the V2G is equal to more than a predetermined value, the aggregator 17 sets the degree of contribution for the power system and an incentive to be high in the electric vehicle 15 having the main battery 104 discharged longer than an instruction from the aggregator 17. Consequently, a profit ratio of an owner of the electric vehicle 15 when performing the V2G becomes high, so that it is possible to promote active participation of the electric vehicle 15 in the V2G. Furthermore, in the case of discharge in the time period in which the power supply amount is smaller than the power demand amount, the stability of the power system is improved. Furthermore, in a power trading market in the V2G, there is an immediately previous adjustment market in which the unit trading time and the unit trading amount are small, separately from a normal trading market, and when the main battery 104 can be discharged longer than the instruction from the aggregator 17, the electric vehicle 15 can perform power selling in the immediately previous adjustment market, so that it is possible to further contribute to the stabilization of the power system. As described above, it is possible to maximize a profit of four parts of the aggregator 17, an owner of the electric vehicle 15, a person running the power system, and the power consumer 13, which are involved in the V2G.

Note that the present invention is not limited to the aforementioned embodiment and modification, improvement and the like can be appropriately made. For example, the bidirectional charger 103 and the charge/discharge ECU 107 of the electric vehicle 15 may be provided to the external power supply 14. In this case, power exchange between the electric vehicle 15 and the external power supply 14 is performed by a direct current. Furthermore, the battery ECU 108 and the radio unit 109 of the electric vehicle 15 start up or stop in accordance with an instruction indicated by a signal received in the digital communication unit 102 even when the electric vehicle 15 is being parked.

DESCRIPTION OF REFERENCE NUMERALS AND CHARACTERS 11 power station
12 power transmission network
13 power consumer
14 external power supply
15 electric vehicle
16 communication network
17 aggregator
18 home gateway
21 cable
22 connector
23 digital communication unit
101 inlet
102 digital communication unit
103 bidirectional charger
104 main battery
105 converter
106 sub-battery
107 charge/discharge ECU
108 battery ECU
109 radio unit
201 power amount database
202 setting information database
203 analysis unit
204: decision unit
205 transmission unit
206 radio unit

The invention claimed is:
1. A V2G system comprising:
a power system;
a charging/discharging device including an electricity storage unit that is provided in a transport equipment, a power conversion unit that converts power transferred between the electricity storage unit and the power system, a reception unit that receives a signal from an external device, and a control unit that controls an operation of the power conversion unit based on the signal received by the reception unit; and
a server device that manages charging and discharging of the electricity storage unit in the charging/discharging device,
wherein the server device performs a time-series analysis on an amount of power supplied from a power supplier to the power system and an amount of power supplied from the power system to a power consumer, determines a period of time during which power is discharged from the electricity storage unit of the charging/discharging device to the power system or during which the electricity storage unit is charged using power supplied from the power system based on a result of estimating a power supply-demand state of the power system and a minimum trading unit of an amount of power managed by the server device during power transfer with the power system, and transmits an instruction including the period of time during which the discharging or the charging is performed to the charging/discharging device,
wherein the server device determines the period of time during which the discharging of the charging/discharging device is performed based on the result of estimating the power supply-demand state, the minimum trading unit of the amount of power managed during power transfer with the power system, and a total amount of power secured for selling to the power system, and
wherein the control unit of the charging/discharging device starts up or stops based on the period of time indicated by the instruction that is transmitted from the server device and is received by the reception unit.

2. The V2G system according to claim 1,
wherein the server device determines the period of time during which the charging of the charging/discharging device is performed based on the result of estimating the power supply-demand state, a degree of contribution of the charging/discharging device to the power system, and a charge appropriateness level of a time slot in which the electricity storage unit is charged such that, as the degree of contribution increases, the electricity storage unit is charged in a time slot having a higher charge appropriateness level, the charge appropriateness level being calculated from an influence on deterioration of the electricity storage unit.

3. The V2G system according to claim 1,
wherein in a case where an amount of power stored in the electricity storage unit is a predetermined amount or higher, the control unit of the charging/discharging device controls an operation of the power conversion unit such that the discharging starts at a time, which is earlier by a predetermined period of time than a start time of the discharging indicated by the instruction, and is performed until an end time of the discharging indicated by the instruction, and
the server device manages a degree of contribution of each of the charging/discharging devices to the power system and sets the contribution to be high for the charging/discharging device including the electricity storage unit which performs the discharging for a period of time longer than the period of time during which the discharging is performed indicated by the instruction.

4. The V2G system according to claim 1,
wherein in a case where a preset activeness of discharging from the electricity storage unit to the power system is a predetermined value or higher, the control unit controls an operation of the power conversion unit such that the discharging starts at a time, which is earlier by a predetermined period of time than a start time of the discharging indicated by the instruction, and is performed until an end time of the discharging indicated by the instruction, and
the server device manages a degree of contribution of each of the charging/discharging devices to the power system and sets the contribution to be high for the charging/discharging device including the electricity storage unit which performs the discharging for a period of time longer than the period of time during which the discharging is performed indicated by the instruction.

5. The V2G system according to claim 1,
wherein in a case where an amount of power stored in the electricity storage unit is a predetermined amount or higher, the control unit controls an operation of the power conversion unit such that the discharging starts at a start time of the discharging indicated by the instruction and is performed until a time which is later by a predetermined period of time than an end time of the discharging indicated by the instruction, and
the server device manages a degree of contribution of each of the charging/discharging devices to the power system and sets the contribution to be high for the charging/discharging device including the electricity storage unit which performs the discharging for a period of time longer than the period of time during which the discharging is performed indicated by the instruction.

6. The V2G system according to claim 1,
wherein in a case where a preset activeness of discharging from the electricity storage unit to the power system is a predetermined value or higher, the control unit of the charging/discharging device controls an operation of the power conversion unit such that the discharging starts at a start time of the discharging indicated by the instruction and is performed until a time which is later by a predetermined period of time than an end time of the discharging indicated by the instruction, and
the server device manages a degree of contribution of each of the charging/discharging devices to the power system and sets the contribution to be high for the charging/discharging device including the electricity storage unit which performs the discharging for a period of time longer than the period of time during which the discharging is performed indicated by the instruction.

7. A method of charging and discharging an electricity storage unit in a V2G system, the V2G system including a power system, a charging/discharging device, and a server device,
the charging/discharging device including the electricity storage unit that is provided in a transport equipment, a power conversion unit that converts power transferred between the electricity storage unit and the power system, a reception unit that receives a signal from an external device, and a control unit that controls an operation of the power conversion unit based on the signal received by the reception unit,
the server device managing charging and discharging of the electricity storage unit in the charging/discharging device, and
the method comprising:
causing the server device to perform a time-series analysis on an amount of power supplied from a power supplier to the power system and an amount of power supplied from the power system to a power consumer, to determine a period of time during which power is discharged from the electricity storage unit of the charging/discharging device to the power system or during which the electricity storage unit is charged using power supplied from the power system based on a result of estimating a power supply-demand state of the power system and a minimum trading unit of an amount of power managed by the server device during power transfer with the power system, and to transmit an instruction including the period of time during which the discharging or the charging is performed to the charging/discharging device;
causing the server device to determine the period of time during which the discharging of the charging/discharging device is performed based on the result of estimating the power supply-demand state, the minimum trading unit of the amount of power managed during power transfer with the power system, and a total amount of power secured for selling to the power system; and
causing the control unit of the charging/discharging device to start up or stop based on the period of time indicated by the instruction that is transmitted from the server device and is received by the reception unit.

* * * * *